United States Patent [19]
Westberg

[11] 3,718,341
[45] Feb. 27, 1973

[54] SNOWMOBILE ANTI-SKID DEVICE
[76] Inventor: Russell C. Westberg, 10653 Johnson Road, Minneapolis, Minn.
[22] Filed: Sept. 17, 1971
[21] Appl. No.: 181,417

[52] U.S. Cl. .................................................. 280/28
[51] Int. Cl. ............................................. B62b 17/00
[58] Field of Search ............ 280/28, 21 R; 180/5 R, 6

[56] References Cited
UNITED STATES PATENTS 3,643,978  2/1972  Westberg ............................. 280/28
3,632,126  1/1972  Shorrock .............................. 280/28
3,545,560  12/1970  Fox ....................................... 280/28

Primary Examiner—Benjamin Hersh
Assistant Examiner—Robert R. Song
Attorney—Harold D. Jastram

[57] ABSTRACT

An anti-skid device for a snowmobile ski attached to the wear bar of each of the steering skis of the snowmobile to prevent the ski and snowmobile from sliding sideways in snow or on icy surfaces by preventing a lateral movement of the steering ski when the snowmobile is making a turn.

4 Claims, 5 Drawing Figures

PATENTED FEB 27 1973 3,718,341

INVENTOR.
RUSSELL C. WESTBERG
BY Harold D. Jastram

SNOWMOBILE ANTI-SKID DEVICE

The present invention relates to an apparatus for stabilizing a ski and more particularly to an anti-skid device attached to the wear bar of a ski to prevent it from sliding sideways.

Snowmobiles use skis as a steering mechanism for the machine. These skis function with reasonable satisfaction except when the snowmobile is turned at relatively high speeds. When this turning occurs, the skis tend to slide sideways and consequently, the driver, however skillful, may lose or does indeed lose control of his machine at these times. This loss of control is particularly noticeable when the machine is driven on icy surfaces such as in races, on the frozen surfaces of lakes, or the like.

It is, therefore, an object of the present invention to provide a new and improved anti-skid device for stabilizing a snowmobile ski.

It is another object of the present invention to provide an anti-skid device for a snowmobile ski to prevent the ski from slipping sideways while the ski is used to make a hard turn on a relatively compacted icy surface.

Figure 1:
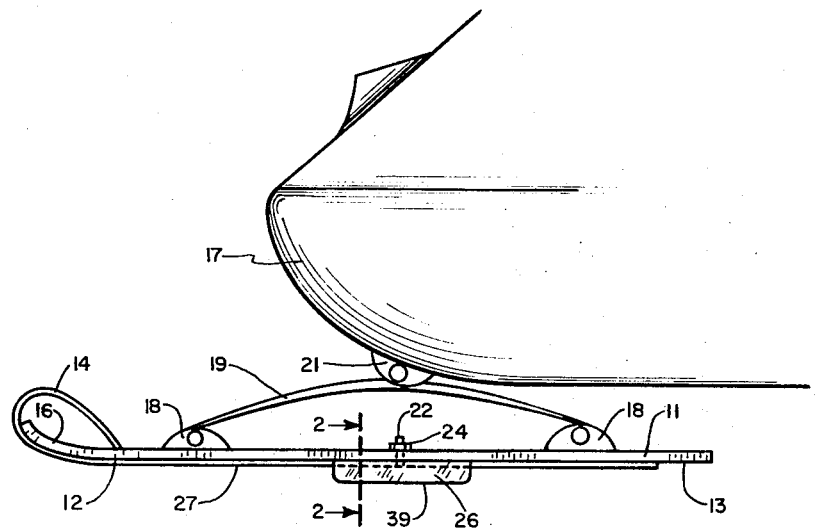
Figure 2:
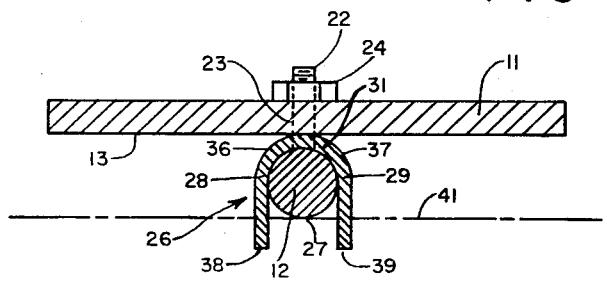
Figure 3:
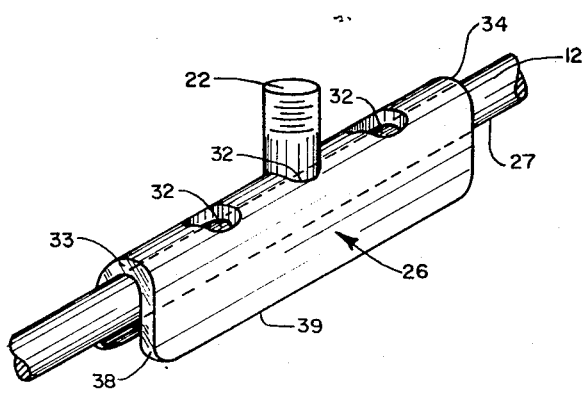

The invention can be more clearly understood by reference to the specification and the drawings in which:

FIG. 1 is a side view of a snowmobile ski showing an anti-skid device according to the present invention attached to the wear bar running along the lower surface of the ski, FIG. 2 is a cross-sectional view taken along line z—2 of FIG. 1 showing the method of mounting an anti-skid device to a wear bar of a ski and illustrating a U-shaped anti-skid device, FIG. 3 is an isometric view illustrating an anti-skid device according to the present invention.

Figure 4:
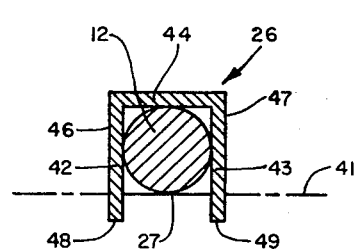
Figure 5:
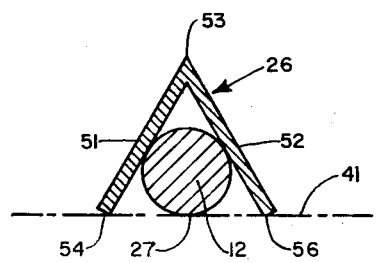

FIG. 4 is a cross-sectional view of an alternate embodiment of the invention illustrating an anti-skid device having a generally rectangular cross section, and FIG. 5 is a cross-sectional view of an alternate embodiment of the anti-skid device according to the present invention illustrating a device having a generally V-shaped cross section.

Refer first to FIG. 1 of the drawings which shows a snowmobile ski 11 having a wear bar 12 which runs along the lower surface 13 of the ski 11 and which makes a turn 14 over the front end 16 of the ski 11. The ski 11 is attached to snowmobile 17 through the use of brackets 18, a spring device 19, and a pivot bracket 21.

Wear bar 12 is a replaceable bar which is designed to protect the ski 11 from highly abrasive surfaces such as gravel, rocks, and the like. This wear bar 12 is connected to the ski 11 (see FIGS. 1 and 2) by a bolt 22 which extends through an aperture 23 in ski 11 and is secured in place by burr 24.

An anti-skid device 26 according to the present invention is attached over wear bar 12 (saddle fashion) so that the device 26 encloses the wear bar 12, except for the lower surface 27 of the wear bar 12 which makes contact with the snow or ice (see FIGS. 1 and 3). In a preferred embodiment of the invention, the anti-skid device 26 has a U-shaped configuration (see FIGS. 2 and 3). Reference to FIG. 2 of the drawings will reveal that the U-shaped skid device 26 has a first side 28 and a second side 29. These sides are interconnected by a web 31. Web 31 is made sufficiently large so that the sides 28 and 29 enclose the wear bar 12 on substantially three sides of the bar but leaving the lower surface 27 free to contact the terrain surface. An aperture 32 provides a means for bolting the wear bar 12 securely between the wear bar 12 and the lower surface 13 of the ski 11. The aperture 32 can be located intermediate the ends 33 and 34 of the device 26. FIG. 3 of the drawings illustrates a device which has three apertures 32 so that the operator of the vehicle may choose a different location for the device on the wear bar 12. This permits the operator to "balance" his skis and place the device 26 at the position along the length of the ski 11 which provides him with the most desirable traction for the particular operation of his vehicle in which he is interested. Location of device 26 at different points along the length of ski 11 will be influenced by the balance point of the ski and other operating characteristics of the particular machine.

Whereas the top edges 36 and 37 of sides 28 and 29 are interconnected by web 31, the lower edges 38 and 39 of the anti-skid device extend, in the case of the U-shaped device, below the lower surface 27 of the wear bar 12. These lower edges 38 and 39 engage the ice and snow and afford the vehicle proper anti-skid action by cutting into the snow and ice running surface. Lower edges 38 and 39 can terminate at horizontal plane 41, illustrated in FIG. 2 of the drawings by the dotted line; however, it has been found that the preferred method of constructing the device 26 is to extend the sides 29 sufficiently to terminate edges 38 and 39 below plane 41, thus affording greater anti-skid action.

Reference to FIG. 3 of the drawings will indicate that each end of the edges 38 and 39 are beveled to permit more gradual and effective engagement of the device 26 with the running surface.

Reference to FIG. 4 of the drawings will reveal that the anti-skid device 26 need not utilize a U-shaped cross-sectional configuration. FIG. 4 illustrates an anti-skid device 26 utilizing a rectangular cross-sectional shape in which sides 42 and 43 are substantially parallel to each other as with the U-shaped device 26 illustrated in FIG. 2. The upper edges 46 and 47 of sides 42 and 43 respectively are connected in this case by a web 44 which is perpendicular to the sides 42 and 43. Web 44 is perpendicular in this particular configuration in substantially the same manner that web 31 is perpendicular to the sides 28 and 29 in the U-shaped configuration illustrated in FIG. 2 of the drawings. Other than the fact that the device in FIG. 4 has a rectangular cross section, it operates in substantially the same fashion as the U-shaped device. It fits over the wear bar 12, saddle fashion, as previously described and the lower edges 48 and 49 engage the terrain running surface as previously described. Again, these edges 48 and 49 can terminate at plane 41 which coincides with the lower surface 27 of wear bar 12 or they can extend below the surface 27 for greater traction.

Refer next to FIG. 5 of the drawings which illustrates a further embodiment of the invention utilizing a V-shaped cross-sectional anti-skid device 26. The V-shaped device 26 has sides 51 and 52 which are joined at edge 53 to form a V cross-sectional shape. The sides 51 and 52 enclose the wear bar 12. Edges 54 and 56 of sides 51 and 52 respectively terminate at the same level as the bottom surface 27 of the wear bar 12. The peculiarities of the V-shaped cross-sectional area permit the device 26 having a V-shape to have sides 51 and 52 which terminate as illustrated in FIG. 5 and still provide anti-skid characteristics which are somewhat better than a device 26 which utilizes substantially parallel sides as illustrated in FIGS. 2 and 4. In all other respects, the V-shaped embodiment of the invention works exactly as described in connection with the above-identified embodiments. The lower edges 54 and 56 of sides 51 and 53 engage a running surface and prevent the ski from skidding sideways. Sides 51 and 52 substantially encompass the wear bar 12 in saddle fashion. As with the U-shaped anti-skid device, this embodiment is bolted to the wear bar 12.

The above specific embodiments and examples are merely illustrative of the principles of the invention and are not to be construed as limiting thereof since many variations thereof may be made by those skilled in the art without departing from the spirit and scope of the invention. For example, the sides of the U-shaped and rectangular-shaped anti-skid devices 26 need not be exactly parallel. The sides can be something less than parallel as illustrated by the V-shaped device. Further, the web arrangement may be altered somewhat depending upon such facts as the shape of the ski bottom, the shape of the wear bar 12, and the like.

Now, therefore, I claim:

1. An anti-skid device for a snowmobile ski having a wear bar with a fastening bolt rigidly secured thereto which comprises first and second sides, a first edge on each of said sides which are interconnected along the length of the sides, each of said sides having second edges on each of said sides which are beveled at each end for engaging snow and ice, means for securing said device to said ski, said means including a bolt opening located intermediate the ends of the sides and at the interconnection of said sides to receive said fastening bolt therethrough, said second edges of each of said sides being separated from each other a predetermined distance to snugly enclose said wear bar between said sides, said sides being of sufficient width to extend the second edges of said sides at least to the surface of said wear bar in contact with the snow surface.

2. An anti-skid device in accordance with claim 1 in which said sides are interconnected along said first edges by a web having an arcuate cross section to form an anti-skid device having a U-shape cross section and in which said second edges of said first and second sides extending below the surface of said wear bar which contacts the snow.

3. An anti-skid device in accordance with claim 1 in which said sides are parallel with each other and are interconnected along said first edges by a web which is perpendicular to the first and second sides to form an anti-skid device having a generally rectangular cross section and in which said second edges of said first and second sides extending below the surface of said wear bar which contacts the snow.

4. An anti-skid device in accordance with claim 1 in which the first edges of said first and second sides are directly connected to form an anti-skid device having a substantially V-shaped cross section.

* * * * *